(12) United States Patent
Bell

(10) Patent No.: US 9,618,136 B2
(45) Date of Patent: Apr. 11, 2017

(54) ROTARY VALVE POSITION INDICATOR

(71) Applicant: FISHER CONTROLS INTERNATIONAL LLC, Marshalltown, IA (US)

(72) Inventor: Brandon Wayne Bell, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 464 days.

(21) Appl. No.: 14/027,661

(22) Filed: Sep. 16, 2013

(65) Prior Publication Data

US 2015/0075652 A1    Mar. 19, 2015

(51) Int. Cl.
*F16K 37/00* (2006.01)
*F16K 1/22* (2006.01)

(52) U.S. Cl.
CPC .......... *F16K 37/0008* (2013.01); *F16K 1/221* (2013.01); *F16K 37/0016* (2013.01); *F16K 37/0033* (2013.01); *F16K 37/0041* (2013.01); *F16K 37/0058* (2013.01); *Y10T 137/8225* (2015.04); *Y10T 137/8242* (2015.04); *Y10T 137/8275* (2015.04); *Y10T 137/8292* (2015.04)

(58) Field of Classification Search
CPC ............. F16K 37/0008; F16K 37/0016; F16K 37/0041; F16K 37/003; F16K 37/0058; Y10T 137/8275; Y10T 137/8292; Y10T 137/8242; Y10T 137/8225
USPC ......................................................... 251/286
See application file for complete search history.

(56) References Cited

U.S. PATENT DOCUMENTS

| 2,817,026 | A | * | 12/1957 | Robinson | ................. | H02K 9/24 |
| | | | | | | 310/88 |
| 4,235,258 | A | * | 11/1980 | Uno | .................... | F16K 37/0008 |
| | | | | | | 137/556 |
| 4,370,902 | A | | 2/1983 | Fry et al. | | |
| 4,413,683 | A | * | 11/1983 | Hune | ...................... | A62C 3/00 |
| | | | | | | 137/382 |
| 4,445,075 | A | | 4/1984 | Fry | | |
| 4,546,671 | A | | 10/1985 | Fry | | |
| 4,572,932 | A | | 2/1986 | Sanders | | |
| 4,584,902 | A | | 4/1986 | Fry | | |

(Continued)

FOREIGN PATENT DOCUMENTS

GB       2229254       9/1990

OTHER PUBLICATIONS

Rotork Process Controls, "CVA Range, Linear and Quarter-turn Control Valve Actuators," Oct. 2013, 32 pages.

(Continued)

*Primary Examiner* — Atif Chaudry
(74) *Attorney, Agent, or Firm* — Hanley, Flight & Zimmerman, LLC

(57) ABSTRACT

A rotary valve position indicator is disclosed. An example apparatus includes an actuator housing defining an explosion-proof enclosure boundary. An actuator output shaft has a first shaft portion and a second shaft portion. The first shaft portion is partially disposed within the explosion-proof enclosure boundary, and the second shaft portion is disposed outside of the explosion-proof enclosure boundary. A visual position indicator is disposed on the second shaft portion of the actuator output shaft and indicates the rotational position of the actuator output shaft relative to the actuator housing.

20 Claims, 8 Drawing Sheets

(56) References Cited

U.S. PATENT DOCUMENTS

| | | | |
|---|---|---|---|
| 5,139,653 | A | 8/1992 | Ludlam et al. |
| 5,223,822 | A | 6/1993 | Stommes et al. |
| 5,313,151 | A | 5/1994 | Ogden et al. |
| 5,865,272 | A | 2/1999 | Wiggins et al. |
| 6,044,791 | A | 4/2000 | LaMarca et al. |
| 6,289,749 | B1 | 9/2001 | Sanders |
| 6,392,322 | B1 * | 5/2002 | Mares .................... B23Q 5/58 310/12.04 |
| 7,055,795 | B2 | 6/2006 | Lay |
| D533,845 | S | 12/2006 | Lay |
| D583,397 | S | 12/2008 | Sanders et al. |
| D587,211 | S | 2/2009 | Greenslade |
| 7,609,056 | B2 | 10/2009 | Junk et al. |
| 7,739,978 | B2 | 6/2010 | Beckman et al. |
| 8,118,276 | B2 | 2/2012 | Sanders et al. |
| 8,272,281 | B2 | 9/2012 | McCarty |
| 8,387,657 | B2 | 3/2013 | Zhuang et al. |
| 2007/0012367 | A1 * | 1/2007 | Hotz .................... F16K 5/0647 137/556.3 |
| 2007/0262029 | A1 * | 11/2007 | Yoshida ............... B01D 61/025 210/741 |
| 2009/0071554 | A1 | 3/2009 | Beckman et al. |
| 2009/0114867 | A1 | 5/2009 | Miller et al. |
| 2011/0290332 | A1 | 12/2011 | Soldo et al. |
| 2012/0227534 | A1 | 9/2012 | Bell et al. |
| 2012/0234097 | A1 | 9/2012 | Petersen |
| 2013/0042933 | A1 | 2/2013 | Harper, Jr. |
| 2013/0206530 | A1 | 8/2013 | Adams |
| 2013/0212893 | A1 | 8/2013 | Stafford et al. |

OTHER PUBLICATIONS

Rotork Process Controls, "CVQ Series, Installation & Maintenance Instructions, Quarter-turn Control Valve Actuator," Jun. 2013, 60 pages.

International Searching Authority, "International Search Report," issued in connection with PCT Application No. PCT/US2014/055834, mailed on Jan. 5, 2015, 2 pages.

International Searching Authority, "Written Opinion of the International Searching Authority," issued in connection with PCT Application No. PCT/US2014/055834, mailed on Jan. 5, 2015, 7 pages.

Flowserve, "Automax Valve Automation Systems—Rotary Switches and Positioners," flowserve.com, FCD AXEMBR0006-05, 2006, 24 pages.

Emerson Process Management, "Fisher 2052 Diaphragm Rotary Actuator," Product Bulletin, www.Fisher.com, Mar. 2013, 12 pages.

Emerson Process Management, "Discrete Valve Controllers—Position Monitoring and Control of Automated On/Off Valves," Topworx, www.topworx.com, 2013, 32 pages.

Emerson Process Management, "Valvetop D2-FF: Foundation Filedbus—Installation, Operation & Maintenance Manual," Topworx, www.topworx.com, 2013, 56 pages.

Emerson Process Management, "Control Valve Handbook," Fourth Edition, 2005, 297 pages.

International Searching Authority, "International Preliminary Report on Patentability," issued in connection with PCT Application No. PCT/US2014/055834, issued on Mar. 22, 2016, 8 pages.

* cited by examiner

ROTARY VALVE POSITION INDICATOR

TECHNICAL FIELD

The present disclosure pertains to fluid valves and, more particularly, to a position indicator for rotary fluid valves.

BACKGROUND

Process control plants or systems often employ rotary fluid valves, such as ball valves, butterfly valves, eccentric-disk valves, eccentric-plug valves, etc., to control the flow of process fluids. Rotary valves typically include a fluid flow control member disposed in a fluid path and rotatably coupled to a body of the rotary valve via a shaft. Typically, a portion of the shaft extending from the rotary valve is operatively coupled to a shaft of an actuator (e.g., a pneumatic actuator, an electric actuator, a hydraulic actuator, etc.) of the rotary valve.

Certain rotary fluid valves include a visual position indicator to display the angular position of the actuator output shaft or the valve shaft, thereby indicating the position of the fluid flow control member within the valve body. A visual position indicator allows a process engineer or instrument technician to observe valve position and operation without having to connect any additional equipment, such as a laptop or meter, to a valve controller of the valve.

Visual position indicators can be electrical or mechanical. Electrical visual position indicators utilize electronic visual displays, such as LED or LCD displays, to display valve position indicated by an electronic position sensor that is configured to produce an electrical signal in response to changes in the angular position of the valve shaft. Such electronic visual position indicators may be undesirable in certain applications because they require additional power to operate and may be prohibitively expensive. Furthermore, electronic visual position indicators may require operator input or interaction to display position, which may be undesirable for valves installed in areas that are difficult to reach.

Mechanical visual position indicators are directly or indirectly coupled to an actuator output shaft or a valve shaft, and thus do not require additional power to operate. Therefore, mechanical visual position indicators allow process engineers or instrument technicians to observe valve position despite a loss of power. In contrast, electronic visual position indicators merely display the output of the electronic position sensors. Therefore, if the electronic sensors fail, the shaft position is not easily determinable. However, mechanical visual position indicators are directly or indirectly coupled to the actuator output shaft or the valve shaft and operate independently of any electronic position sensors. Therefore, mechanical visual position indicators continue to display shaft position even if the electronic sensors fail. Furthermore, mechanical visual position indicators provide a secondary position indication in addition to the position signal from the electronic position sensor. This secondary position indication may be helpful during setup and calibration phases to validate that the position sensors are operating accurately.

In many applications, it is desirable to minimize power consumption of fluid valve components. Many valves are installed in remote locations, such as oil fields, where external power may not be available. As such, certain valves may operate using energy captured by photovoltaic cells. The cost of photovoltaic cells is often proportional to their energy output. Therefore, fluid valves are designed to minimize power requirements to minimize the size of solar systems needed to power the valves. Thus, mechanical visual position indicators are often desirable because they operate without requiring any additional power.

Many fluid valves are utilized in harsh and/or hazardous environments, and compliance to industry standards related to such environments drives specific design requirements. In certain applications, fluid valves are used in facilities in which the operating environments may include combustible gases, vapors or other compounds. For example, fluid valves are often used in natural gas processing plants or facilities where hydrogen gas is used. The National Electric Code (NEC) in the United States and the Canadian Electric Code (CEC) require that electrical equipment used in hazardous locations carry the appropriate approval from a recognized approval agency. The three main approval agencies in North America are Factory Mutual (FM) and Underwriters Laboratories (UL) in the United States and Canadian Standards Association (CSA) in Canada. Approvals consist of the type of protection and the class, division, groups, and temperature of the operating environment. Certifications commonly used in North America include, for example, explosion-proof, intrinsically safe, non-incendive, and dust ignition-proof.

Electronics within an actuator, for example, may cause a spark that has the potential to ignite a combustible gas or vapor within or surrounding the actuator housing. Explosion-proof valve actuators utilize an enclosure that is capable of withstanding an explosion of a gas or vapor within it and preventing the ignition of a combustible gas or vapor that may surround it. In addition to having sufficient strength to contain an explosion, all passageways connecting the interior of an explosion-proof enclosure to the exterior environment must also provide flame paths to allow the burning gases to escape from the device as they expand during an internal explosion, but only after they have been cooled sufficiently to prevent the ignition of gases or vapors in the external environment. Interfaces defining flame paths must be manufactured to extremely tight tolerances, which may require specialized manufacturing techniques. Furthermore, additional components such as seals may be needed to seal flame paths from the external environment. As such, it is desirable to reduce the total number of interfaces that define flame paths through an enclosure to minimize cost and complexity.

A known visual position indicator comprises a rotary position wheel mounted external to a valve actuator enclosure, opposite a valve shaft. Typically the rotary position wheel is indirectly coupled to the actuator output shaft via additional shafts, gears, cams, and/or other types of coupling members to display the shaft position. The indicator typically includes a polycarbonate shell or cover to protect the rotary position wheel from the external environment. Although this type of position indicator provides a visual position display without requiring electrical power, its location external to the valve actuator enclosure requires an additional opening in the enclosure. For explosion-proof enclosures, this requires machining holes and manufacturing parts to tight tolerances and requires additional seals to seal the interface from the external environment.

SUMMARY

An example apparatus includes an actuator housing defining an explosion-proof enclosure boundary. An actuator output shaft has a first shaft portion and a second shaft portion, the first shaft portion partially disposed within the explosion-proof enclosure boundary, and the second shaft portion disposed outside of the explosion-proof enclosure boundary. A visual position indicator is disposed on the second shaft portion of the actuator output shaft and indicates the rotational position of the actuator output shaft relative to the actuator housing.

Another example apparatus includes a rotary valve actuator housing that has a neck portion, and the neck portion has an indicator window. A mounting bracket is coupled to the neck portion to receive a rotary fluid valve. An actuator output shaft is disposed at least partially within the neck portion and is configured to receive a shaft of the rotary fluid valve. A visual position indicator is coupled to the actuator output shaft to indicate the rotational position of the actuator output shaft. The visual position indicator is viewable through the indicator window.

Another example apparatus includes an actuator housing having first and second compartments connected by a passageway. An actuator output shaft has first and second sections. The first section is at least partially disposed within the first compartment and the passageway, and the second section is at least partially disposed within the second compartment and is configured to receive a shaft of a rotary fluid valve. A visual position indicator is disposed on the second section of the actuator output shaft to indicate the rotational position of the actuator output shaft. The visual position indicator is externally viewable.

DETAILED DESCRIPTION

Fluid control valves may include a visual position indicator to display the position of a valve shaft. This allows a process engineer or instrument technician to observe valve position and operation without having to connect any additional equipment, such as a laptop or meter, to an electronic position sensor. Known visual position indicators may require additional power to operate and/or may require an additional opening into an explosion-proof actuator housing.

Generally, the example rotary valve position indicator in accordance with the present disclosure provides a visual indication of the position of a rotary valve without requiring external power, operator input, specialized equipment, or additional openings into an explosion-proof actuator housing.

Figure 1:
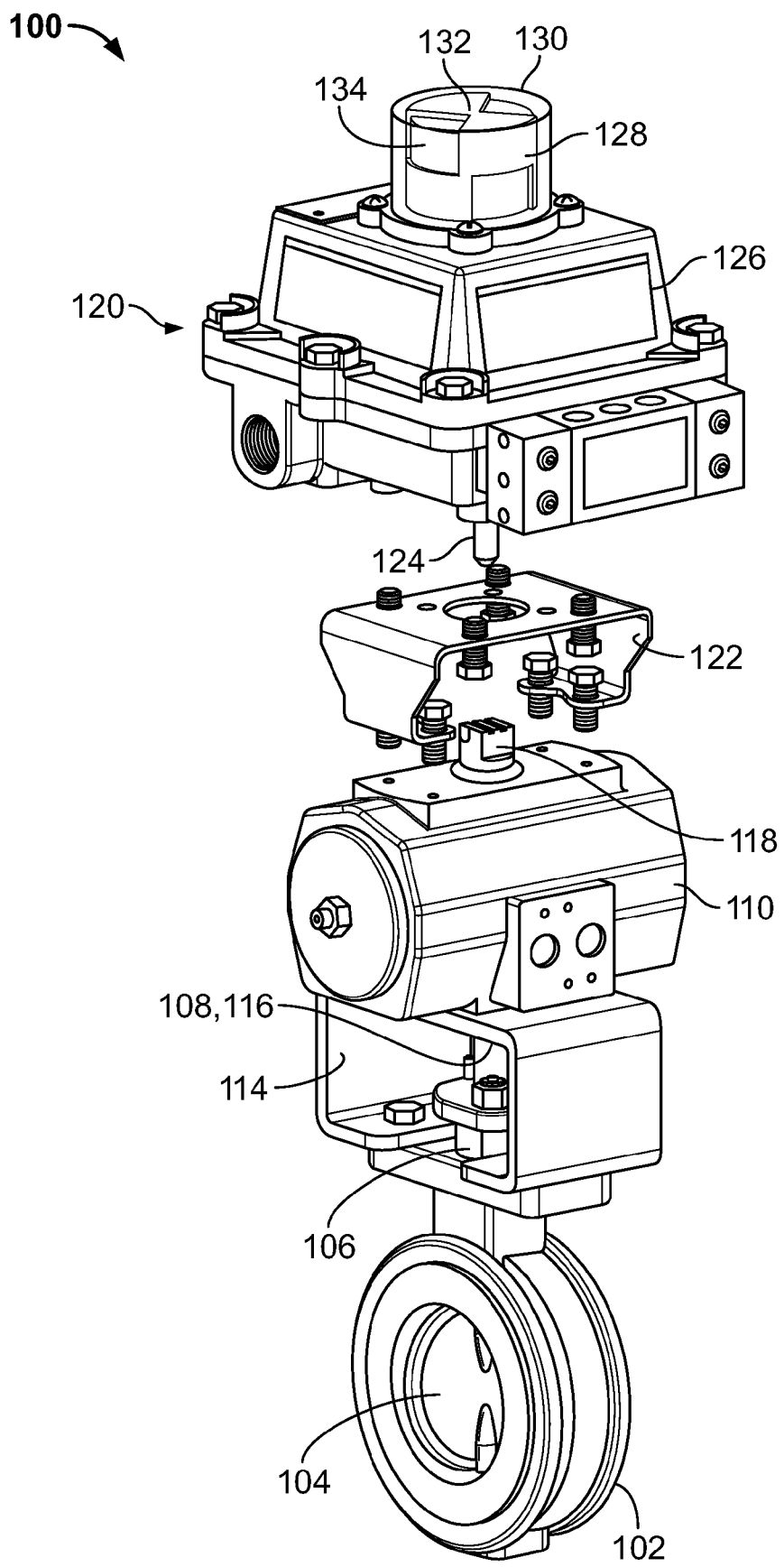
FIG. 1 is an exploded view of a known fluid control valve.

Before describing the example rotary valve position indicator as mentioned above, a brief description of a known visual position indicator is provided in connection with FIG. 1.

Turning now to FIG. 1, a known fluid control valve 100 is shown. The fluid control valve 100 includes a valve body 102 and a fluid control member 104 within the valve body 102, which controls fluid flow therethrough. The fluid control member 104 is coupled to a valve shaft 106, which extends through the valve body 102 and is coupled to an actuator output shaft 108 of an actuator 110. A mounting bracket 114 couples the actuator 110 to the valve body 102. The actuator 110 controls the rotary motion of the fluid control member 104 via the actuator output shaft 108 and the valve shaft 106, thereby controlling fluid flow through the valve body 102.

The actuator output shaft 108 has a first end 116 and a second end 118. The first end 116 is coupled to the valve shaft 106. The second end 118 is opposite the first end 116 and extends through the actuator 110. The actuator output shaft 108 may be unitary such that first end 116 and the second end 118 are directly coupled, or the actuator output shaft 108 may comprise discrete sections such that the first end 116 and the second end 118 are indirectly coupled. In either case, the first end 116 and the second end 118 rotate synchronously with the valve shaft 106.

A valve controller 120 is coupled to the actuator 110 via a mounting bracket 122. The valve controller 120 generates a control signal to control the rotational position of the actuator output shaft 108. An encoder shaft 124 extends from a housing 126 of the valve controller 120 and is coupled to the actuator output shaft 108 such that the encoder shaft 124 and the actuator output shaft 108 rotate synchronously. An encoder (not shown) within the housing 126 produces an electrical output signal corresponding to the rotational position of the encoder shaft 124. This provides a closed feedback loop through which the valve controller 120 may generate a control signal to rotate the actuator output shaft 108, while simultaneously monitoring the actual position of the actuator output shaft 108 via the encoder shaft 124. The valve controller 120 may alter the control signal to achieve a desired angular position of the actuator output shaft 108.

A visual position indicator 128 extends from the housing 126 of the valve controller 120 opposite the encoder shaft 124. The visual position indicator 128 comprises a clear polycarbonate cover 130 affixed to the housing 126, and an indicator drum 132 within the cover 130. The drum 132 is directly or indirectly coupled to the encoder shaft 124 and rotates synchronously with the encoder shaft 124, the actuator output shaft 108, and the valve shaft 106. The drum 132 includes indicia 134 to indicate the position of the valve shaft 106 and, therefore, the position of the fluid control member 104. For example, the drum 132 may include indicia 134 indicating 'OPEN' or 'CLOSED' to indicate whether the flow control member 104 is in an open or a closed position. Alternatively or additionally, the indicia 134 on the drum 132 may include various colors or color gradients, such as green and red, to indicate whether the flow control member 104 is in an open, closed, or intermediate position.

In the example fluid valve 100 as depicted in FIG. 1, the actuator 110 and the controller 120 are separate components. In other known fluid valves, the actuator 110 and the controller 120 may be integrated within a single component. Such fluid valves may have a visual position indicator disposed on an external surface of the actuator housing opposite the valve end and operable through an opening in the actuator housing.

Figure 2:
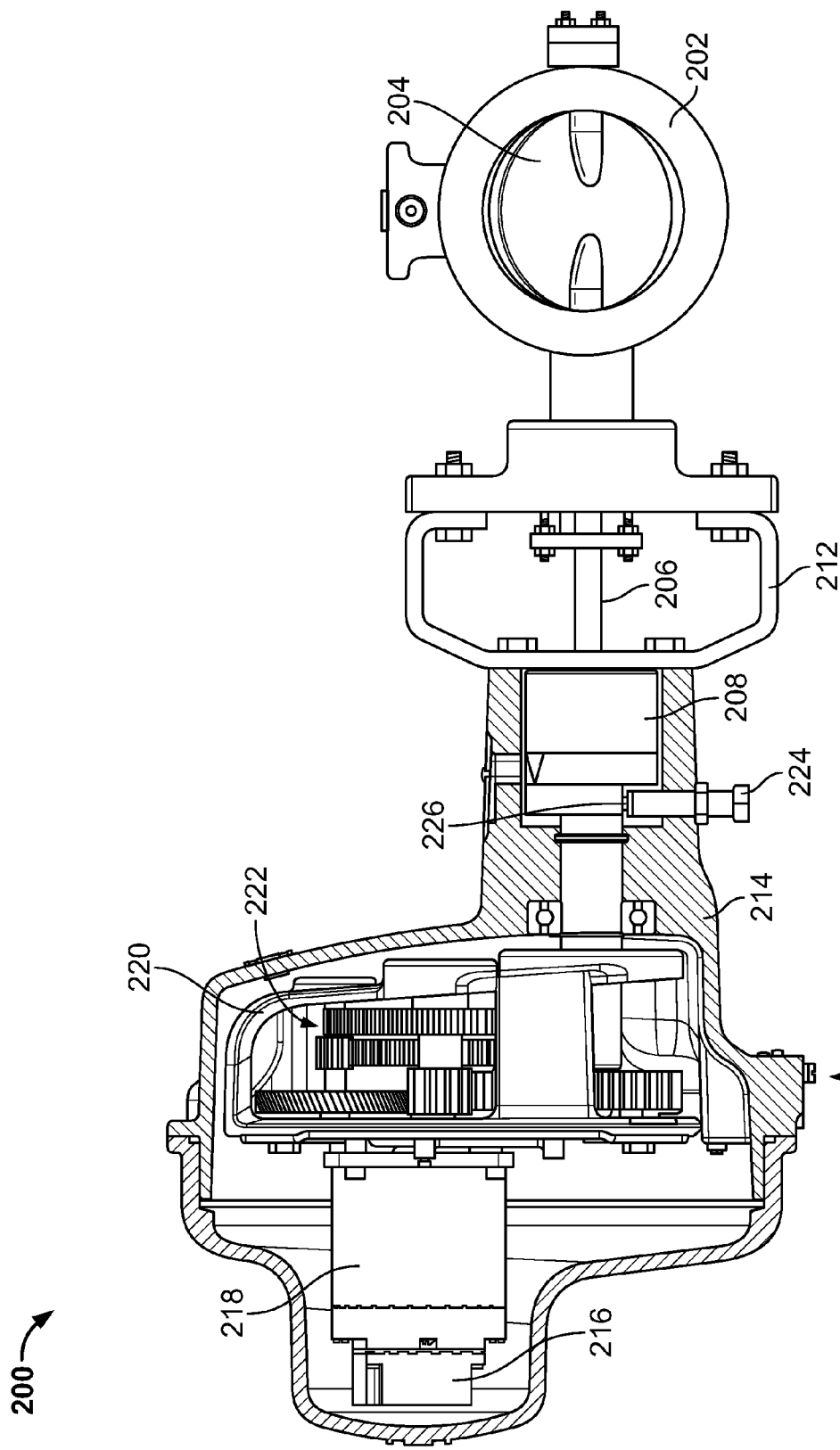
FIG. 2 is a cross-sectional view of an example fluid control valve.

Turning now to FIG. 2, a cross-sectional view of an example fluid control valve 200 is depicted in accordance with the teachings of this disclosure. While the following apparatus and methods are described in conjunction with the example fluid control valve 200, which is a rotary butterfly valve, the example apparatus and methods may also be used with any other types rotary valves such as, for example, a full bore ball valve, a segmented ball valve, a V-notch ball valve, a butterfly valve, an eccentric disc valve, an eccentric plug valve, or other types of rotary valves. Also, although the following apparatus and methods are described in conjunction with electric actuators (e.g., a Fisher® easy-Drive™ Electric Actuator), the example apparatus and methods may also be used with any type of rotary actuator such as, for example, a pneumatic actuator, a hydraulic actuator, an electro-hydraulic actuator, a manual actuator, etc.

The example fluid control valve 200 includes a valve body 202 and a fluid control member 204 within the valve body 202, which controls fluid flow therethrough. The fluid control member 204 is coupled to a valve shaft 206, which extends through the valve body 202 and is coupled to an actuator output shaft 208 of an actuator 210. A mounting bracket 212 couples the actuator 210 to the valve body 202. The actuator 210 controls the rotary motion of the fluid control member 204 via the actuator output shaft 208 and the valve shaft 206, thereby controlling fluid flow through the valve body 202.

The actuator 210 includes an actuator housing 214, which encloses an electronic controller 216, an electric motor 218, and a gearbox 220. The electronic controller 216 is electrically coupled to the electric motor 218, which may be a brushless DC motor. The electric motor 218 is operably coupled to the gearbox 220, which is operably coupled to the actuator output shaft 208. In operation, the electronic controller 216 sends a control signal to the electric motor 218 to control the operation thereof. In turn, the electric motor 218 rotates a gear set 222 within the gearbox 220 to generate a desired output velocity and torque of the actuator output shaft 208. The actuator output shaft 208 and the valve shaft 206 rotate synchronously such that the actuator 210 operates to control the rotational position of the fluid control member 204, thereby controlling fluid flow through the valve body 202. A travel stop member 224 coupled to the actuator housing 214 may engage a notched portion 226 of the actuator output shaft 208 to limit the rotational travel thereof. The travel stop member may comprise, e.g., a bolt or a pin.

Figure 3:
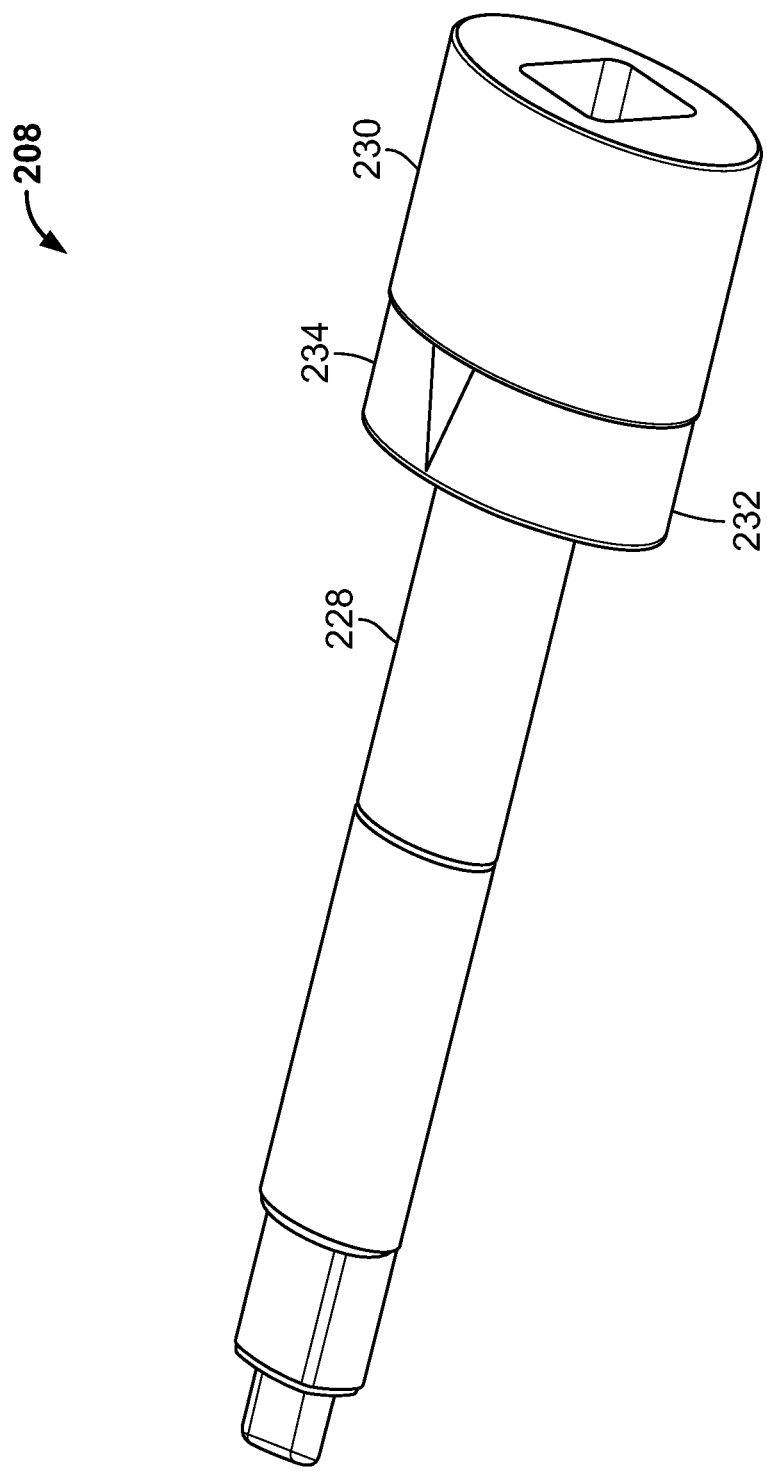
FIG. 3 is a view of an example actuator output shaft including an example visual position indicator.

Turning now to FIG. 3, a view of an example actuator output shaft 208 is depicted. The actuator output shaft 208 has a first shaft portion 228 and a second shaft portion 230, the second shaft portion 230 having a larger diameter than the first shaft portion 228. A visual position indicator 232 is fixably disposed on the second shaft portion 230 and has a marker 234 to provide a fixed point of reference on the actuator output shaft 208. By locating the visual position indicator 232 on a portion of the actuator output shaft 208 of a larger diameter, the visual position indicator 232 is larger and easier to visually observe.

Figure 4:
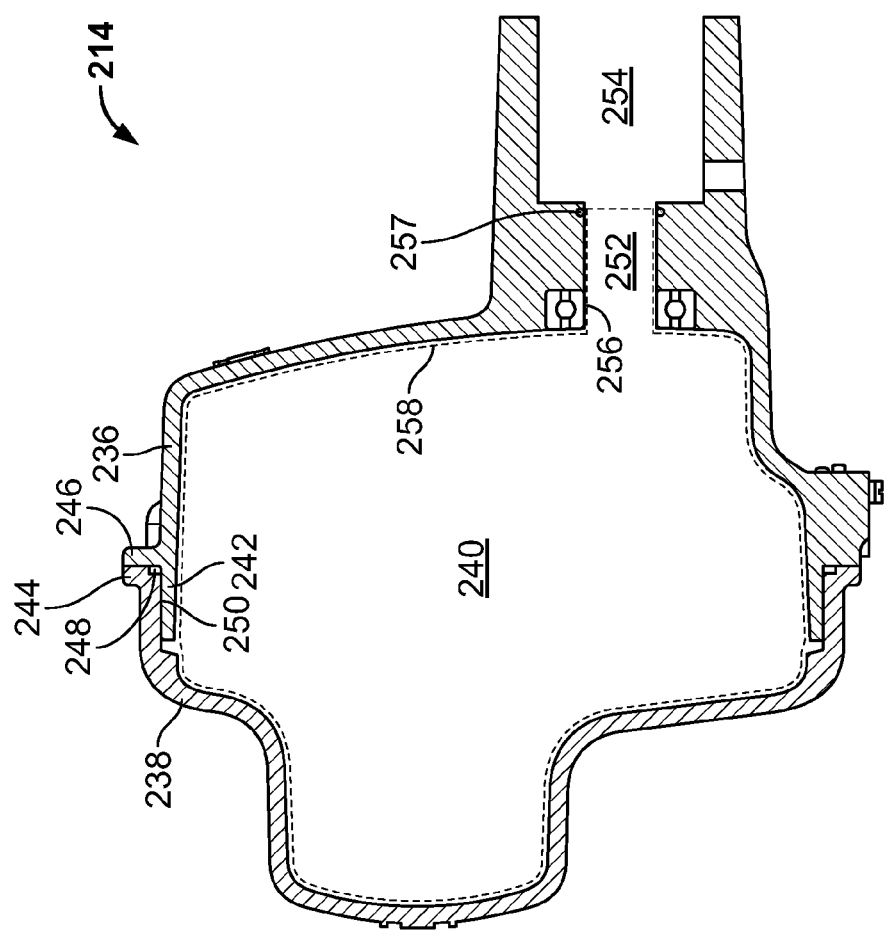
FIG. 4 is a cross-sectional view of an example actuator housing illustrating an explosion-proof boundary.

Turning now to FIG. 4, a cross-sectional view of the example actuator housing 214 is depicted. The actuator housing 214 includes a base 236 and a cover 238, which engages the base 236 to enclose a first interior compartment 240 of the actuator housing 214. More specifically, the base 236 has a lip 242 over which the cover 238 fits until a flange 244 of the cover 238 engages a flange 246 of the base 236, thereby compressing a seal 248. This coupling of the base 236 and the cover 238 defines a first flame path 250 therebetween. The base 236 and the cover 238 are manufactured such that the first flame path 250 is held to very tight tolerances to meet strict certification standards discussed above, such as explosion-proof, intrinsically safe, non-incendive, and dust ignition-proof standards. For the sake of clarity and brevity, the actuator housing is described herein as "explosion-proof." However, the term "explosion-proof" as used herein is intended to include all industry standards relating to operation in harsh and/or hazardous environments, including but not limited to explosion-proof, intrinsically safe, non-incendive, and dust ignition-proof.

Figure 5:
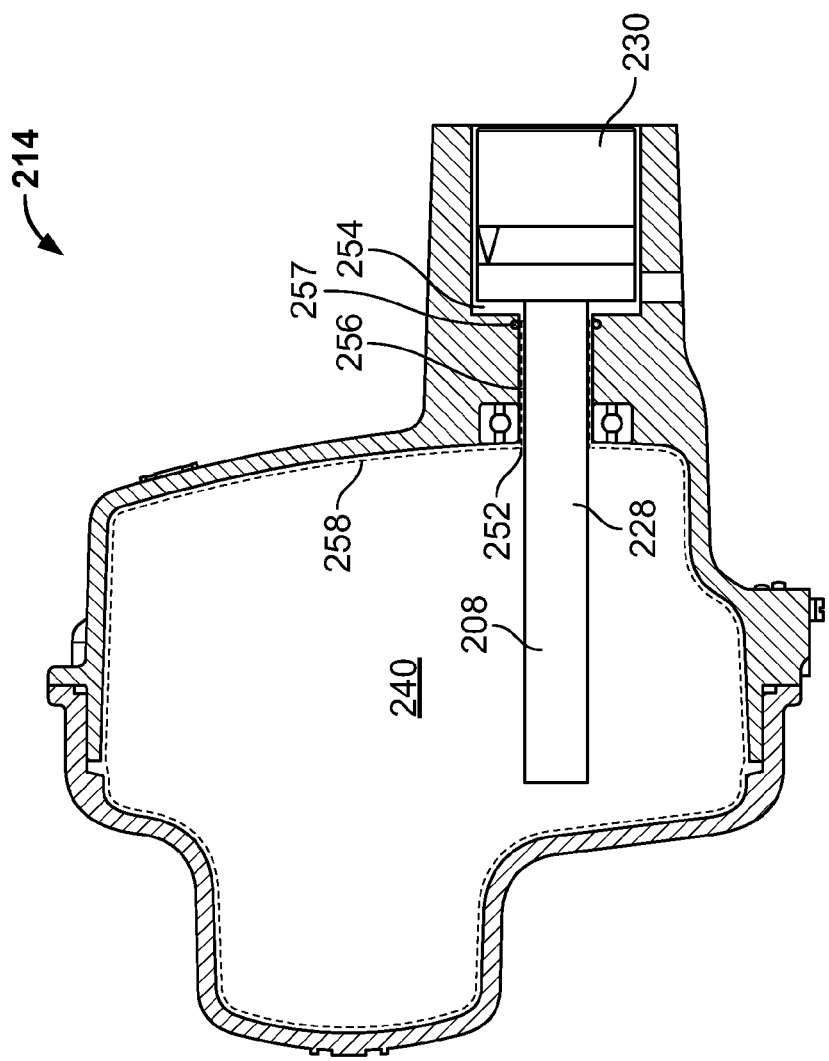
FIG. 5 is a cross-sectional view of the example actuator housing of FIG. 4 including an example actuator output shaft.

The base 236 of the actuator housing 214 defines a passageway 252 that fluidly couples the first interior compartment 240 to a second interior compartment 254. The passageway 252 and the second interior compartment 254 are further described in connection with FIG. 5, which depicts the actuator output shaft 208 in connection with the actuator housing 214 of FIG. 4. As shown in FIG. 5, the first portion 228 of the actuator output shaft 208 extends from the first interior compartment 240 of the actuator housing 214, through the passageway 252, and partially into the second interior compartment 254. The second portion 230 of the actuator output shaft 208 extends from the first portion 228 within the second interior compartment 254. The passageway 252 is slightly larger than the first portion 228 of the actuator output shaft 208, such that the gap between first portion 228 and the passageway 252 defines a second flame path 256 that extends up to an o-ring seal 257.

The first and second flame paths 250, 256 define an explosion-proof boundary 258, which comprises the first interior compartment 240 and the passageway 252 of the actuator housing 214 up to the o-ring seal 257. If an explosion occurs within the explosion-proof boundary 258 of the actuator housing 214, the first and second flame paths 250, 256 allow burning gases within the explosion-proof boundary 258 to escape from the actuator housing 214, but only after they have been cooled sufficiently to prevent the ignition of gases or vapors that may surround the explosion-proof boundary 258. The explosion-proof boundary 258 also seals the interior compartment 240 and the passageway 252 up to the o-ring seal 257 from the external environment. Furthermore, the dimensional tolerances of components outside of the explosion-proof boundary 258 need not be as tight as the dimensional tolerances of the components that define the first and second flame paths 250, 256.

Figure 6:
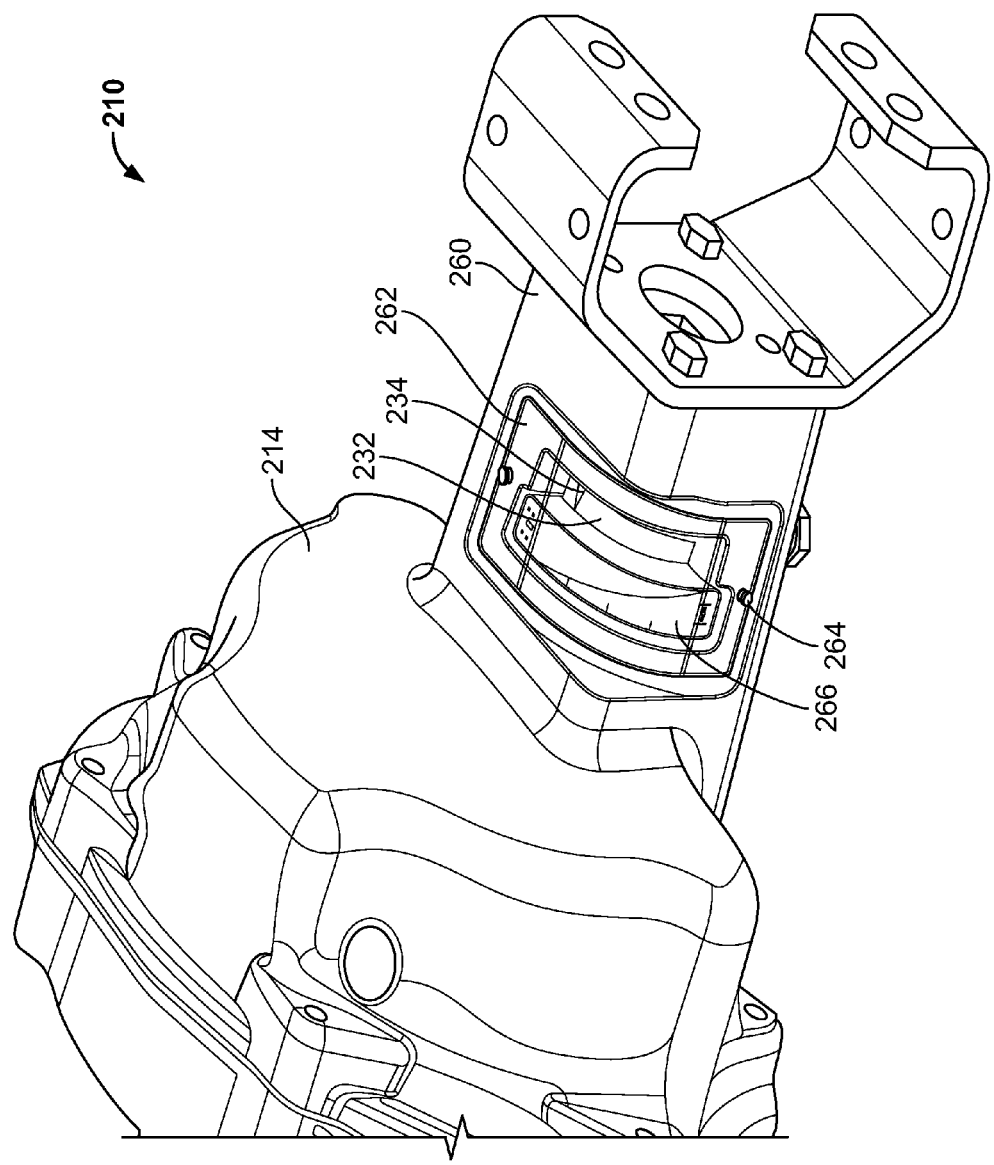
FIG. 6 is a view of an example control valve actuator including an example visual position indicator.

Turning now to FIG. 6, a view of the actuator 210 including the example visual position indicator 232 is shown. The second interior compartment 254 of the actuator housing 214 is disposed within a neck portion 260 of the actuator housing 214. The section of the neck portion 260 comprising the second interior compartment 254 is located outside of the explosion-proof boundary 258 and includes a window 262 through which the visual position indicator 232 is viewable. The window 262 may comprise a transparent material such as clear polycarbonate, glass, or other materials through which the visual position indicator 232 is viewable. By locating the window 262 outside of the explosion-proof boundary 258, the material of the window 262 and the coupling of the window 262 to the neck portion 260 need not be designed for compliance with explosion-proof standards. Therefore, the design, manufacturing, and materials of the window 262 and components associated therewith are significantly less expensive and complex than they would be if they were designed to comply with explosion-proof standards. The window 262 may be coupled to the neck portion 260 of the actuator housing 214 via fasteners 264, such as, e.g., screws, bolts, or pins. Alternatively, the window 262 may be coupled to the neck portion 260 via an adhesive. A gasket (not shown) may be disposed between the window 262 and the neck portion 260 to seal the second interior compartment 254 to prevent foreign material from entering therein.

A scale 266 is fixed to the neck portion 260 adjacent the visual position indicator 232 and is viewable through the window 262. In one example, the scale 266 is disposed on a recessed surface of the neck portion 260 that is sized to receive the scale 266. The scale 266 includes indicia representing angular positions of the actuator output shaft 208, which may comprise, e.g., angular measurements, percent of travel, and/or various colors or color gradients. In operation, the indicia of the scale 266 aligned with the marker 234 of the visual position indicator 232 represents the rotational position of the actuator output shaft 208 and, therefore, the position of the fluid control member 204.

Figure 7A:
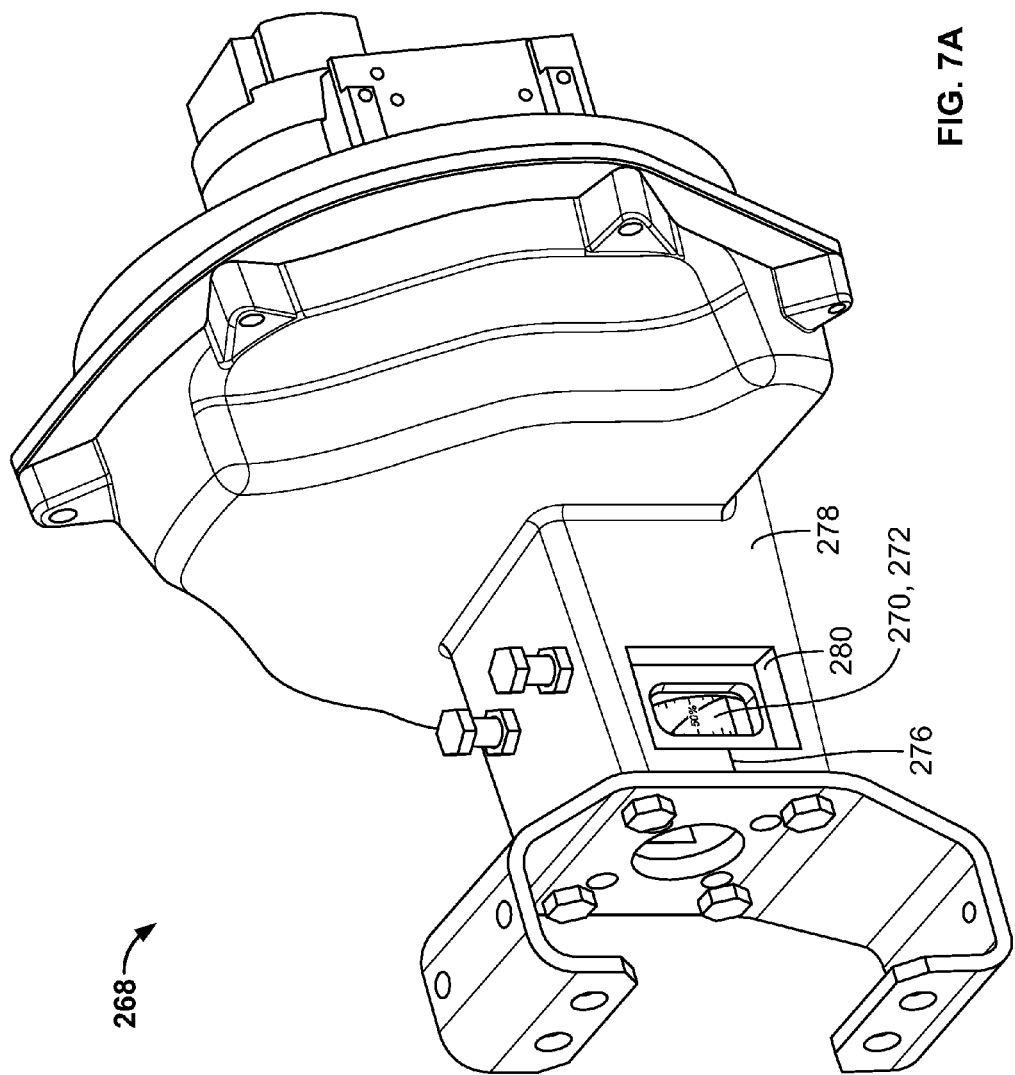
FIG. 7A is a view of an example control valve actuator including an example visual position indicator.
Figure 7B:
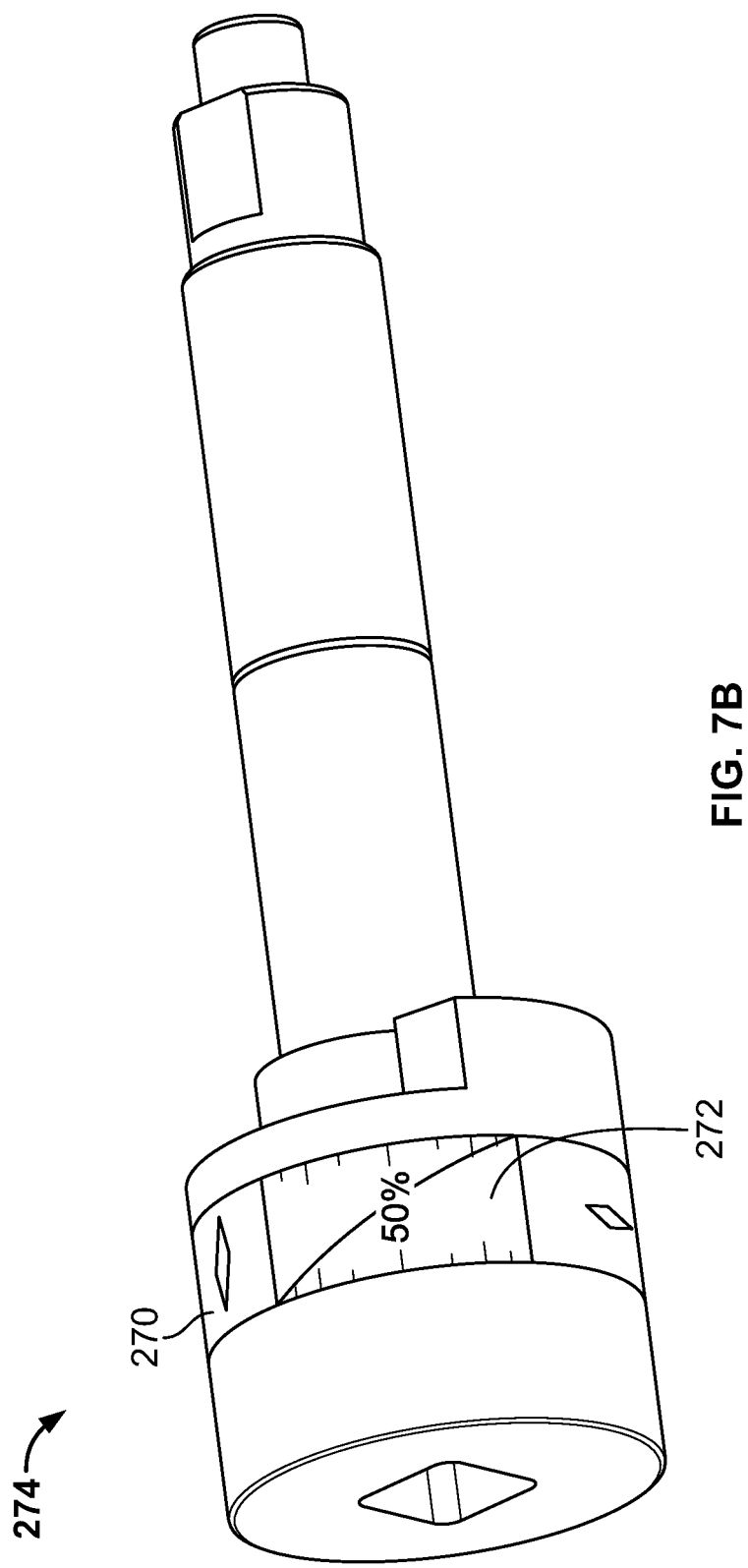
FIG. 7B is the actuator output shaft of the example control valve actuator of FIG. 7A.

FIG. 7A is a view of another example actuator 268 including an example visual position indicator 270. As depicted in FIG. 7B, a scale 272 of the visual position indicator 270 is disposed an actuator output shaft 274. Referring back to FIG. 7A, a marker 276 may be disposed on a neck portion 278 or a window 280 of the actuator 268. In operation, the marker 276 remains static and the scale 272 of the visual position indicator 270 rotates in connection with the actuator output shaft 274. Thus, as in the previous example, the indicia of the scale 272 aligned with the marker 276 represents the rotational position of the actuator output shaft 274 and, therefore, the position of the fluid flow control member 204. In this example, a smaller window 280 may be utilized as compared to the window 262 of FIG. 6 because the entire scale 272 need not be displayed at all times. The scale 272 of the visual position indicator 270 rotates with the actuator output shaft 274 so it is only necessary to observe the portion of the scale 272 that is aligned with the marker 276. This configuration may be preferable in applications that require greater structural strength of the actuator housing 268 due to the smaller size requirement of the window 280.

Although certain methods, apparatus, and articles of manufacture have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. An apparatus, comprising:
   an actuator housing defining an explosion-proof enclosure boundary;
   an actuator output shaft having a first shaft portion and a second shaft portion, the first shaft portion partially disposed within the explosion-proof enclosure boundary, and the second shaft portion disposed outside of the explosion-proof enclosure boundary;
   an O-ring seal at least partially defining the explosion-proof enclosure boundary and disposed in the actuator housing, the O-ring seal to directly contact an outer diameter of the actuator output shaft, the O-ring seal defining the first and second shaft portions, wherein the second shaft portion defines an indicating portion of the actuator shaft;
   a visual position indicator; and
   a scale aligned with the visual position indicator to indicate a rotational position of the actuator output shaft relative to the actuator housing.

2. The apparatus of claim 1, wherein the visual position indicator is positioned on the indicating portion and viewable through a window on the actuator housing.

3. The apparatus of claim 2, wherein the scale is positioned on the actuator housing and the visual position indicator is positioned on the actuator output shaft.

4. The apparatus of claim 2, wherein the visual position indicator is positioned on the actuator housing, and the scale is positioned on the actuator output shaft.

5. The apparatus of claim 1, wherein the actuator housing comprises an explosion-proof enclosure.

6. The apparatus of claim 1, wherein the explosion-proof enclosure has no more than two flame paths.

7. An apparatus, comprising:
   a rotary control valve actuator housing having a neck portion, the neck portion having an indicator window, the actuator housing at least partially defining an explosion-proof enclosure;
   a mounting bracket coupled to the neck portion to receive a rotary control valve;
   an actuator output shaft disposed at least partially within the neck portion, the actuator output shaft configured to receive a shaft of the rotary control valve;
   an O-ring seal to directly contact an outer diameter of the actuator output shaft, the O-ring seal at least partially defining the explosion-proof enclosure and defining an indicating portion of the actuator output shaft; and
   a visual position indicator disposed on the indicating portion of the actuator output shaft and outside of the explosion-proof enclosure, the visual position indicator to indicate a rotational position of the actuator output shaft over a range of travel of the actuator output shaft, the visual position indicator viewable through the indicator window.

8. The apparatus of claim 7, wherein the neck portion is at least partially outside of the explosion-proof enclosure.

9. The apparatus of claim 8, wherein the visual position indicator is disposed within a section of the neck portion that is outside of the explosion-proof enclosure.

10. The apparatus of claim 7, wherein the explosion-proof enclosure has no more than two flame paths.

11. The apparatus of claim 7, further comprising a scale disposed on the actuator housing and viewable through the indicator window, the scale aligned with the visual position indicator to indicate the rotational position of the actuator output shaft.

12. An apparatus, comprising:
   an actuator housing having first and second compartments connected by a passageway, wherein the first compartment defines an explosion-proof enclosure configured to withstand an explosion of a gas or vapor within the first compartment and to prevent ignition of an explosive gas or vapor surrounding the first compartment;
   an actuator output shaft having first and second sections, the first section at least partially disposed within the first compartment and the passageway, and the second section at least partially disposed within the second compartment and configured to receive a shaft of a rotary control valve;
   an O-ring seal to directly contact an outer diameter of the actuator output shaft, the O-ring seal at least partially defining the explosion-proof enclosure, the O-ring seal defining the first and second sections of the actuator output shaft, the second section defining an indicating portion of the actuator output shaft that is outside of the explosion-proof boundary;
   a visual position indicator, the visual position indicator externally viewable; and a scale aligned with the visual position indicator to indicate the rotational position of the actuator output shaft relative to the actuator housing.

13. The apparatus of claim 12, wherein the first compartment comprises a cover coupled to a base at a coupling interface, the coupling interface defining a flame path of sufficient length to cool gas or vapor that has ignited within the first compartment such that it prevents the ignition of the explosive gas or vapor surrounding the first compartment.

14. The apparatus of claim 12, wherein a gap between the first section of the actuator output shaft and the passageway defines a flame path of sufficient length to cool a gas or vapor that has ignited within the first compartment such that it prevents the ignition of an explosive gas or vapor surrounding the first compartment.

15. The apparatus of claim 12, wherein the second section of the actuator output shaft has a larger diameter than the first section.

16. The apparatus of claim 12, wherein the second section of the actuator output shaft comprises a travel stop to limit angular rotation of the actuator output shaft.

17. The apparatus of claim 16, further including a protrusion coupled to the second compartment to engage the travel stop at a predetermined limit of angular rotation of the actuator output shaft.

18. The apparatus of claim 12, wherein the visual indicator is disposed on the second section of the output shaft.

19. The apparatus of claim 12, wherein the visual indicator is disposed on or within the actuator housing.

20. An apparatus, comprising:
an actuator housing having first and second compartments connected by a passageway, wherein the first compartment has no more than two flame paths;
an actuator output shaft having first and second sections, the first section at least partially disposed within the first compartment and the passageway, and the second section at least partially disposed within the second compartment and configured to receive a shaft of a rotary control valve, wherein a gap between the first section of the actuator output shaft and the passageway defines a flame path of sufficient length to cool a gas or vapor that has ignited within the first compartment such that it prevents the ignition of an explosive gas or vapor surrounding the first compartment;
a visual position indicator, the visual position indicator externally viewable; and a scale aligned with the visual position indicator to indicate the rotational position of the actuator output shaft relative to the actuator housing.

* * * * *